(12) United States Patent
Young et al.

(10) Patent No.: US 8,326,346 B2
(45) Date of Patent: Dec. 4, 2012

(54) SYSTEM AND METHOD FOR BATTERY CONSERVATION IN A PORTABLE DEVICE

(75) Inventors: Richard Young, San Clemente, CA (US); Christopher Chambers, Stanton, CA (US)

(73) Assignee: Universal Electronics Inc., Santa Ana, CA (US)

( * ) Notice: Subject to any disclaimer, the term of this patent is extended or adjusted under 35 U.S.C. 154(b) by 494 days.

(21) Appl. No.: 12/724,940

(22) Filed: Mar. 16, 2010

(65) Prior Publication Data

US 2011/0230228 A1  Sep. 22, 2011

(51) Int. Cl.
*H04B 1/38* (2006.01)
(52) U.S. Cl. ...................... 455/550.1; 455/574
(58) Field of Classification Search ............... 455/414.1, 455/418, 419, 550.1, 567, 572, 573, 574, 455/343.1–343.4; 340/511, 541, 573.1
See application file for complete search history.

(56) References Cited

U.S. PATENT DOCUMENTS

| 7,183,897 | B2 | 2/2007 | Tang et al. |
| 8,204,553 | B2 * | 6/2012 | Sutardja ........................ 455/574 |
| 2004/0268391 | A1 | 12/2004 | Clercq et al. |
| 2007/0207795 | A1 | 9/2007 | Roundtree |
| 2007/0243862 | A1 | 10/2007 | Coskun et al. |
| 2008/0084292 | A1 * | 4/2008 | DiPoala ........................ 340/541 |
| 2009/0193366 | A1 | 7/2009 | Davidson |
| 2010/0048256 | A1 * | 2/2010 | Huppi et al. .................. 455/574 |

* cited by examiner

*Primary Examiner* — Thanh Le
(74) *Attorney, Agent, or Firm* — Greenberg Traurig, LLP

(57) ABSTRACT

A hand-held device, such as a remote control, has a time-limited feature, such as backlight illumination, that is caused to be activated upon the occurrence of a triggering event sensed by a triggering sensor, such as a motion sensor. The hand-held device functions to disable and/or downwardly adjust a time period during which the time-limited feature will be allowed to be active upon a future occurrence of a triggering event in response to the device determining that a predetermined number of trigger events sensed via the triggering sensor are false trigger events. The time-limited feature may be disabled by disabling the triggering sensor.

25 Claims, 5 Drawing Sheets

SYSTEM AND METHOD FOR BATTERY
// CONSERVATION IN A PORTABLE DEVICE

BACKGROUND

Battery powered portable devices such as remote controls, mobile phones, cordless phone handsets, PDAs, Web tablets, e-books, etc., frequently employ backlighting techniques to illuminate keys, activate LCD screens, etc., as is well known in the art. In order to conserve battery power, such devices may only energize the backlighting circuitry for a predetermined period of time after a user interacts with a device input means, e.g., by pressing a key, touching a touch screen surface, or the like. Such an approach may however be perceived as user unfriendly since it requires that a user perform a possibly unnecessary interaction with the device in order to activate the illumination. Accordingly, as an alternative (or in addition to), some devices may incorporate motion, tilt, or vibration sensing means in order to respond to a user touching or handling the device generally by automatically energizing the backlighting circuitry, i.e., backlight illumination is caused without requiring an initial user interaction with the input means. Such systems however suffer from the disadvantage that background vibration or other unintentional movement of the device may trigger unwanted illumination cycles to the detriment of battery life.

SUMMARY OF THE INVENTION

This invention relates generally to battery powered hand held devices which incorporate a trigger activated energy consuming feature such as a motion, tilt, or vibration activated LCD or keypad backlighting, EL display panel, etc. In order to minimize the detrimental effect of false triggers of such energy consuming features, an algorithm may be implemented by the operating program of the device for detecting instances of a false triggering of an energy consuming feature, for example a triggered backlight activation that is not followed within a reasonable period of time by some other user interaction with the device, and for reducing or eliminating the activation period of the energy consuming feature in response to such triggering events. In some embodiments the reduction of the activation period of the energy consuming feature may be progressive, for example, in the case of a backlight, successive detected false triggers may cause a progressive reduction in backlight "on" time or intensity until the backlight response to such triggering events is fully disabled. In other embodiments the triggered energy consuming feature response "on" time may remain constant with the triggered energy consuming feature "on" response ultimately being disabled upon the system detecting a threshold number of false trigger counts. Restoration of normal operation of an energy consuming feature adjusted for false triggering may be automatic, e.g., after expiration of a predetermined period of time, upon a detection of a user interaction with the device, such a pressing a key or activating a touch pad, after a triggering event, etc. or restoration of normal operation of an energy consuming feature adjusted for false triggering may require a further, specific user input, as appropriate for a particular embodiment.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
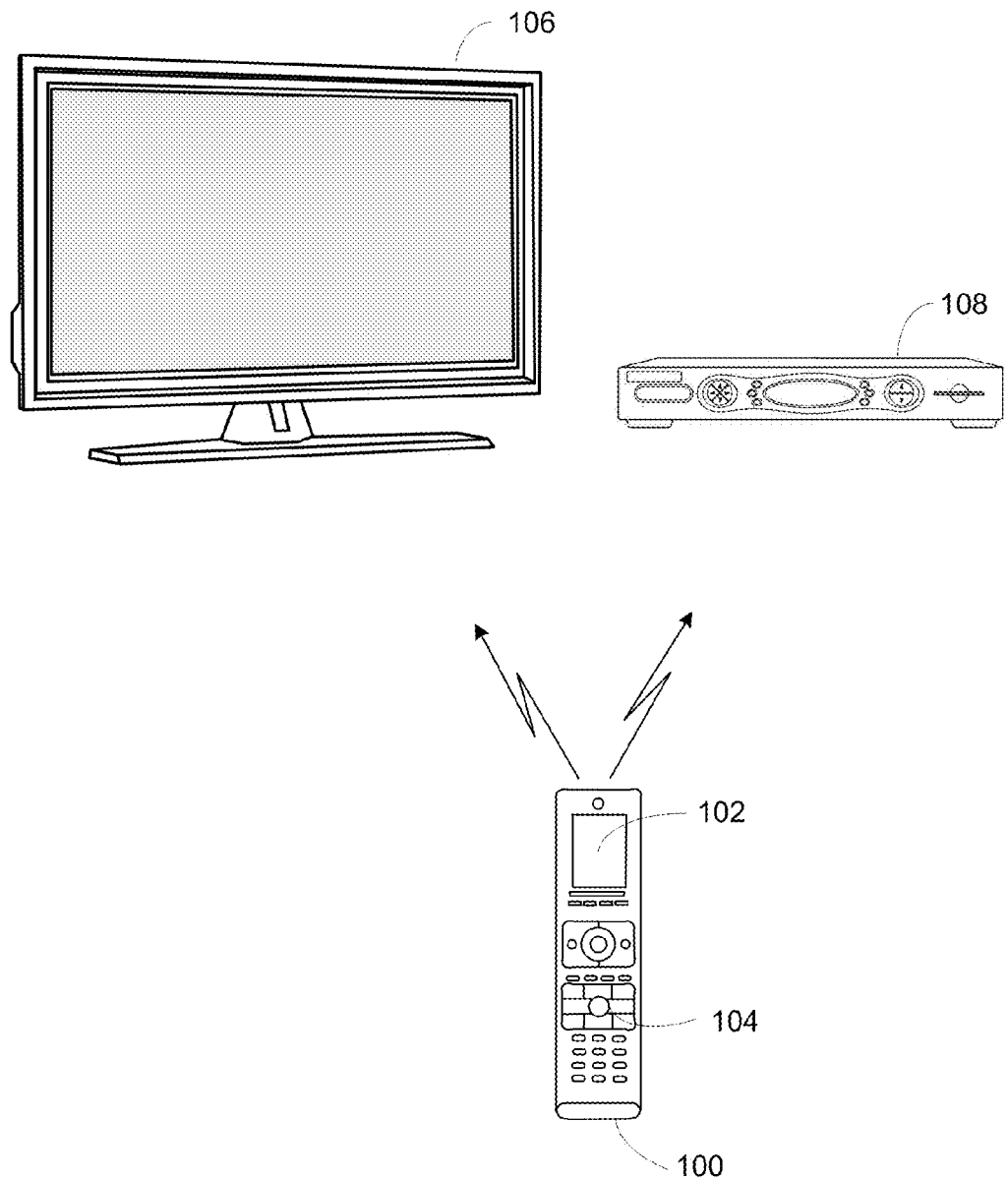
FIG. 1 illustrates an exemplary system including a device incorporating backlighting control methods in accordance with the teachings of this invention.

Turning now to FIG. 1, an exemplary system is illustrated having a battery powered device 100 comprising an energy consuming feature, e.g. a backlight, that is controllable in accordance with the teachings hereinafter described to account for false triggering responses. In the example illustrated in FIG. 1, the battery powered device is in the form of a backlit controlling device which is configurable to control various appliances, such as a television 106 and a set top box ("STB") 108. As is known in the art, the controlling device 100 is capable of transmitting commands to the appliances, using any convenient IR, RF, Point-to-Point, or networked protocol, to cause the appliances to perform operational functions. Controlling device 100 is further equipped with a backlit LCD display 102, and in some embodiments backlit keys 104, both as are well known in the art. Backlight activation and the duration thereof is under the control of the operating program of controlling device 100, which programming may include methods to detect false backlight triggering to thereby alleviate associated battery drain, as will be described in further detail hereinafter.

Figure 2:
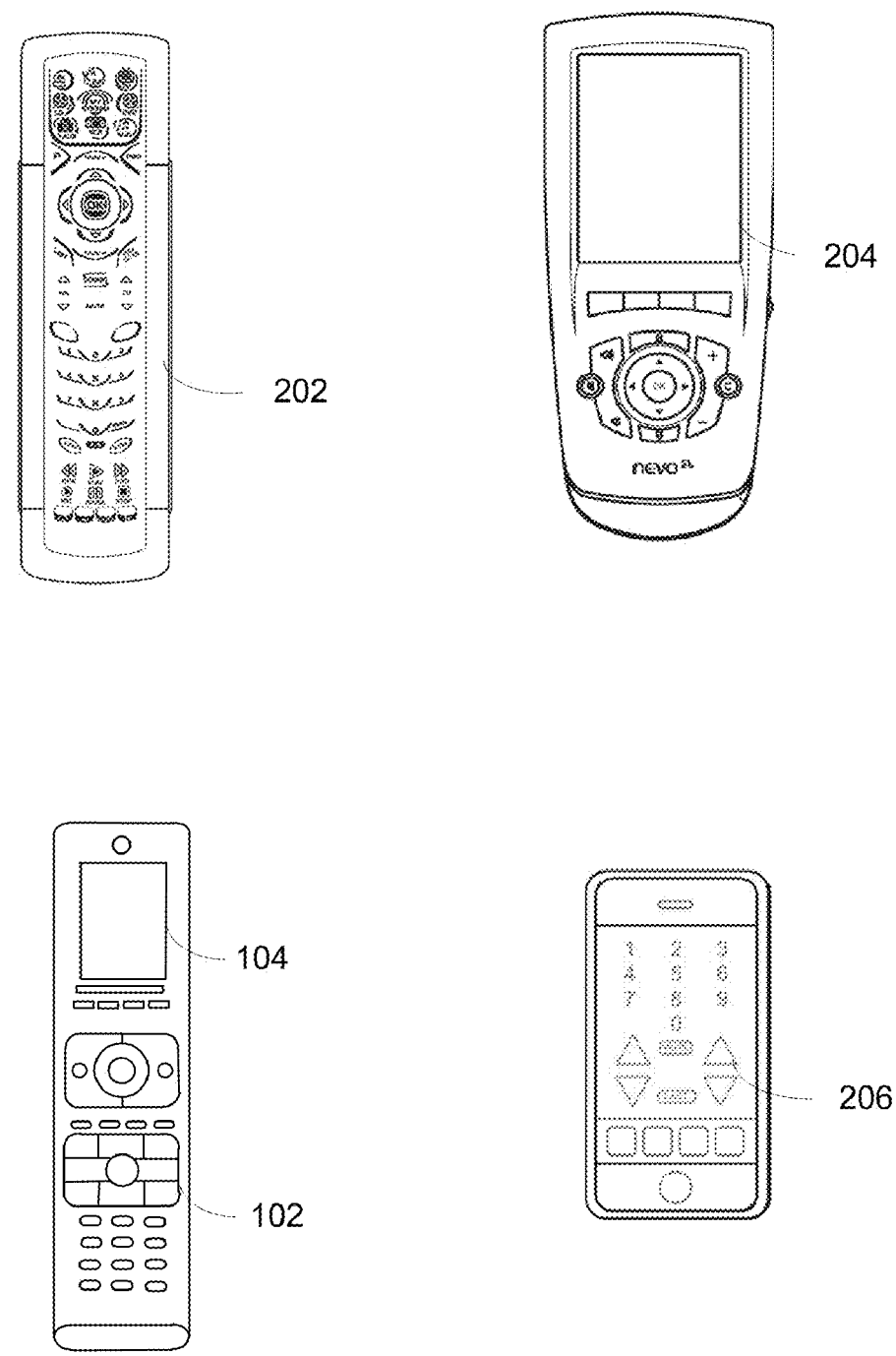
FIG. 2 illustrates various exemplary types of hand held devices in which the methods taught herein may be implemented.

While the illustrative embodiment presented in FIG. 1 comprises a controlling device having an LCD display and/or backlit keys, it will be appreciated that the methods for battery conservation described hereinafter are equally applicable to many other classes of device and operational features. For example, as illustrated without limitation in FIGS. 1 and 2, the methods described hereinafter may be employed in a device to control LCD 102 backlighting; to control keypad 104 backlighting (e.g., in a device of the type described in U.S. Pat. No. 5,568,367); to control illumination of electroluminescent display panels 202 (e.g., in a device of the type described in U.S. Pat. No. 7,013,434); to control illumination of a touch screen 204 or 206 (e.g., in a device of the type described in U.S. Pat. No. 7,610,555 or in a device of the type described in pending U.S. patent application Ser. No. 12/406,601); to control communication receiving and/or sending circuitry, etc. Thus, it is to be appreciated that the battery conservation methods described hereinafter may be applied to any battery powered device having a feature responsive to a triggering event sensed by a triggering sensor, such as a motion, tilt, vibration, sound, light, etc. sensor, regardless of purpose.

Figure 3:
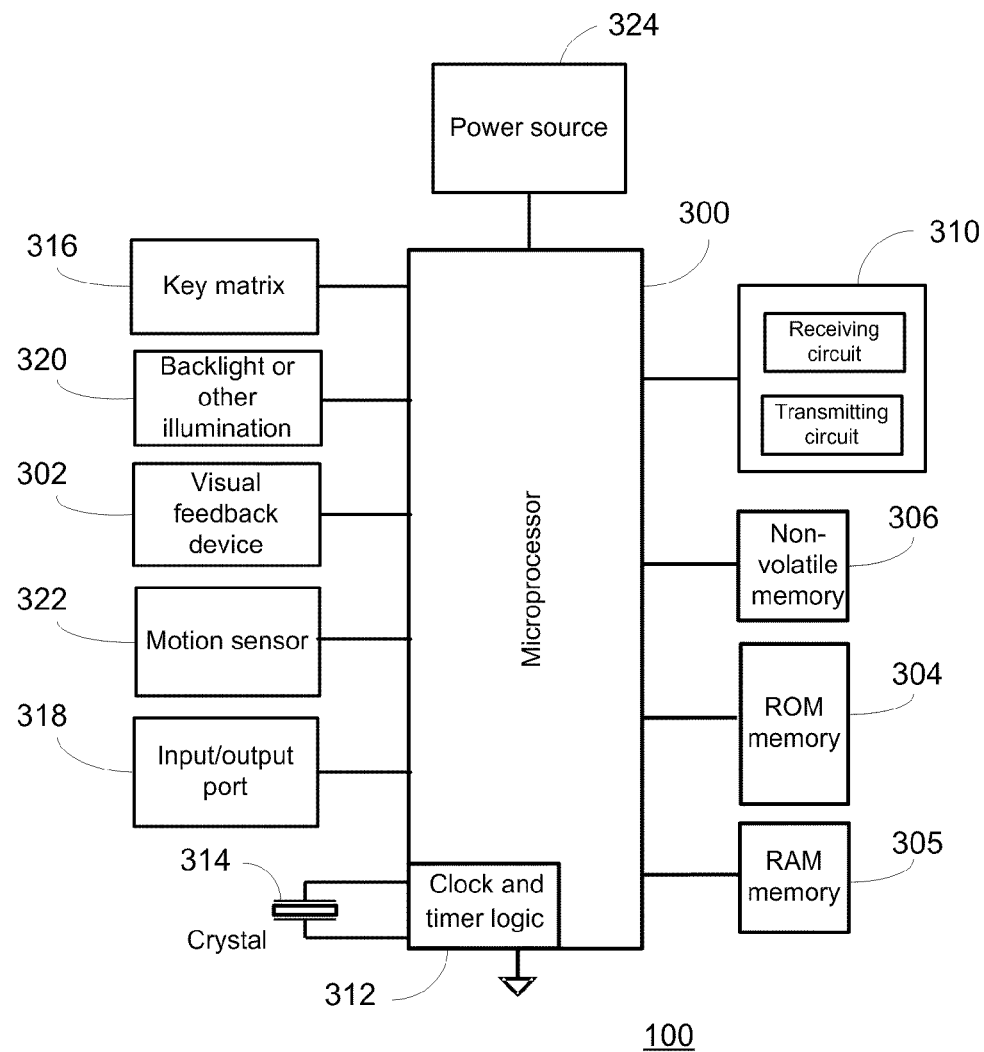
FIG. 3 illustrates a block diagram of exemplary components of the exemplary device of FIG. 1.

Returning now to the illustrative embodiment of FIG. 1 with particular reference to FIG. 3, for use in commanding the functional operations of one or more appliances an exemplary controlling device 100 may include, as needed for a particular application, a processor 300 coupled to a ROM memory 304, a RAM memory 305, a key matrix 316 (e.g., hard keys, soft keys such as a touch sensitive surface overlaid on a liquid crystal (LCD), and/or an electroluminescent (EL) display), transmission circuit(s) and/or transceiver circuit(s) 310 (e.g., IR and/or RF), a non-volatile read/write memory 306, means 302 to provide feedback to the user (e.g., one or more LEDs, display, speaker, and/or the like), an input/output port 318 such as a serial interface, USB port, modem, Zigbee, WiFi, or Bluetooth transceiver, etc., clock and timer logic 312 with associated crystal or resonator 314, a power source 324 such as battery, means 320 for backlighting LCD display 102 and/or keypad 104, and means 322 to detect the device being touched or picked up by a user. Motion detection means 322 may comprise without limitation a tilt switch, accelerometer, touch sensor, proximity sensor, inclinometer, etc., as appropriate for a particular embodiment, all referred to hereafter as a "motion trigger sensor." If sound detection is to be used as a trigger for a device feature, the device may additionally include a sound trigger sensor in the form of a microphone. It will also be appreciated that the device may include still further types of trigger sensors, such as light sensors, etc., without limitation.

As will be understood by those skilled in the art, some or all of the memories 304, 305, 306 may include executable instructions (collectively, the controlling device program memory) that are intended to be executed by the processor 300 to control the operation of controlling device 100, as well as data which serves to define to the operational software the necessary control protocols and command values for use in transmitting command signals to controllable appliances (collectively, the command data). In this manner, the processor 300 may be programmed to control the various electronic components within the remote control 100, e.g., to monitor the key matrix 316, to cause the transmission of signals, etc. The non-volatile read/write memory 306, for example an EEPROM, battery-backed up RAM, FLASH, Smart Card, memory stick, or the like, may additionally be provided to store setup data and parameters as necessary. While the memory 304 is illustrated and described as a ROM memory, memory 304 can also be comprised of any type of readable media, such as ROM, FLASH, EEPROM, or the like. Preferably, the memories 304 and 305 are non-volatile or battery-backed such that data is not required to be reloaded after battery changes. In addition, the memories 304, 305 and 306 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 304 and 306 respectively), and/or may be physically incorporated within the same IC chip as the microprocessor 300 (a so called "microcontroller") and, as such, they are shown separately in FIG. 3 only for the sake of clarity.

To cause the controlling device 100 to perform an action, the controlling device 100 is adapted to be responsive to events, such as a sensed user interaction with the key matrix 316, detection of a triggering event via an appropriate trigger sensor, etc. In response to an event, appropriate instructions within the program memory (hereafter the "controlling device operating program") may be executed. For example, when a function key is actuated on the controlling device 100, the controlling device 100 may retrieve from the command data stored in memory 304, 305, 306 a command value and control protocol corresponding to the actuated function key and, where necessary, current device mode, and transmit that command to an intended target appliance, e.g., TV 106 or STB 108, in a format recognizable by that appliance to thereby control one or more functional operations of that appliance. It will be appreciated that the operating program can be used not only to cause the transmission of commands and/or data to the appliances, but also to perform other operations. While not limiting, other operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

In certain embodiments, controlling device 100 may be universal, that is, adaptable to issue commands to a multiplicity of appliances of different type and/or manufacture. In such cases, for selecting a set of command data to be associated with an appliance to be controlled, data may be provided to the controlling device 100 that serves to identify an intended target appliance by its type and make (and sometimes model). Such data allows the controlling device 100 to identify the appropriate command data within a preprogrammed library of command data that is to be used to transmit recognizable commands in a format appropriate for such identified appliances. Since the operation and features of such universal controlling devices are well known in the art, for the sake of brevity these will not be discussed further herein.

In response to the controlling device being moved, e.g., a user touching or picking up controlling device 100, motion sensor 322 may generate an output for interpretation by the controlling device operating program as a signal to possibly energize a backlight circuit 320 with resultant illumination of LCD display 102 and/or keypad 104. Since motion sensor 322 may also be subject to false triggering due to vibration, inadvertent movement of controlling device 100, etc., the controlling device operating program may apply methods to minimize the effects of such false triggers on battery life, as will now be described in conjunction with FIGS. 4 and 5.

Figure 4:
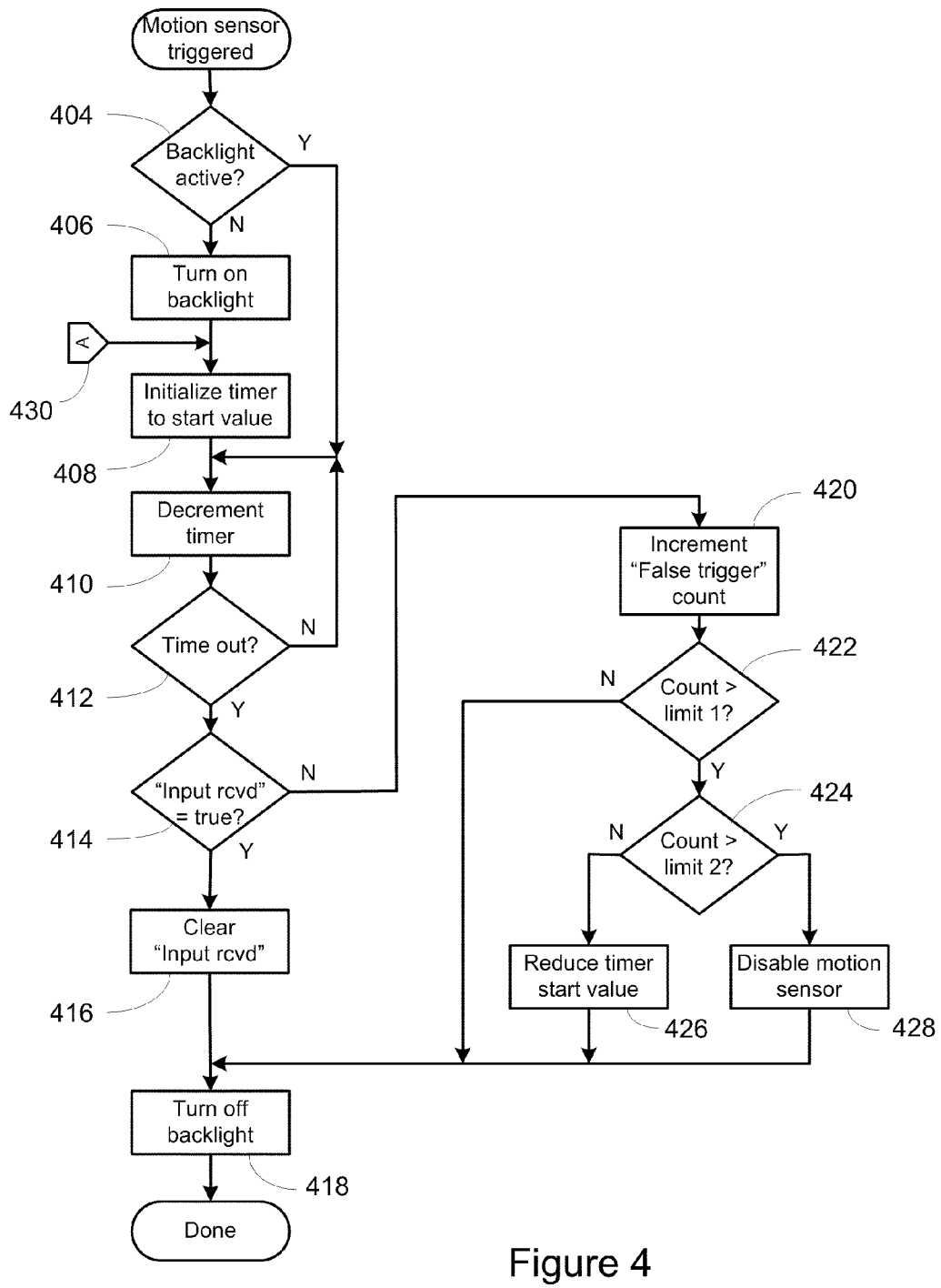
FIGS. 4 and 5 illustrate an exemplary method for detecting and inhibiting false triggering of a sensor activated feature of the exemplary device of FIG. 3.

Turning to FIG. 4, upon a triggering sensor sensing a triggering event, e.g., upon activation of the motion trigger sensor 322, at step 404 the controlling device operating program first determines if the to-be-triggered feature, e.g., backlight illumination, is already active, e.g., the backlight circuitry 320 is currently energized, in which case processing proceeds to step 410 with the feature continuing to perform as previously instructed, e.g., the backlight remains illuminated as a backlight feature timer continues with its presently running timeout count. If not, at step 406 the feature is enabled, e.g., circuitry 320 is energized to turn backlighting on, and at step 408 a feature timer is initialized. The purpose of the feature timer is to turn off the feature, e.g., backlight illumination, after a period of inactivity. In some embodiments the timed period of inactivity may be predetermined, e.g., ten seconds, while in other embodiments the timed period of inactivity may be user adjustable or selectable. Following initialization of the feature timer, at steps 410 and 412 the feature timer is adjusted until a value is reached constituting a time out, e.g., the value is decremented until it reaches zero or another established value, incremented until it reaches an established value, or the like. It will also be noted that processing of user interactions with controlling device 100, described hereafter in conjunction with FIG. 5, continues to this sequence at entry point 430, e.g., the backlight timer is reinitialized with every valid user interaction.

Upon eventual occurrence of the feature timer timing out, at step 414 the controlling device operating program may next check to determine if an "input received" status is set to "true." As will be described later, this value may be set "true" to indicate that a predetermined type of event (e.g., a user interaction with the device, such as a key press) has occurred during the time period being measured by the feature timer. If the "input received" status is "true" upon expiration of the time being measured by the feature timer, the "input received" status is reset to "false" at step 416, the feature, e.g., backlight illumination, is turned off at step 418 and processing is complete. If, however, the "input received" status is "false" (signifying that no actual user interaction with controlling device 100 has occurred after the last detected triggering event, e.g., activation of motion sensor 322) at step 420 a false trigger count may be incremented. Next, at step 422 the controlling device operating program may check if this count is greater than a first limit. If not, the feature, e.g., backlight illumination, is turned off at step 418 and processing is complete. If, however, the false trigger count does exceed a first limit, at step 424 the controlling device operating program next checks if this count is greater than a second limit. If not, at step 426 the time period to be measured by the triggered feature timer at the next iteration of step 408 is shortened and processing continues at step 418 as before. If, however, the false trigger count does exceed a second limit, at step 428 the motion sensor feature is set to inhibit future false triggering of the to-be triggered feature, e.g., "motion sensor disabled," and processing continues at step 418 as before. As will be appreciated, the effect of these steps is to first reduce the activation time, and then inhibit activation of a triggered feature, e.g., backlight illumination, resulting from successive triggering events, e.g., motion sensor triggering, that is not followed by any user interaction with controlling device 100, and that the first and second limit values may be selected as appropriate for a particular embodiment. It will be further appreciated that various other activation period reduction methodologies, for example a single limit absolute on/off, a progressive reduction of duration and/or intensity for the feature, etc., may be substituted for the steps described above. Also, while in the illustrative embodiment motion sensor 322 itself is disabled as a result of repeated false triggering in order to maximize energy conservation, it will be appreciated that for other embodiments in which motion sensor input is used for multiple purposes (or where it is not possible to individually disable the motion sensor circuitry), only certain energy consuming feature or features may be disabled, rather than the motion sensor itself. For example without limitation, in embodiments where a motion sensor enables both backlighting and a touch sensitive input panel only the backlighting may be disabled, thus ensuring that user input via said touch panel is still detectable.

Figure 5:
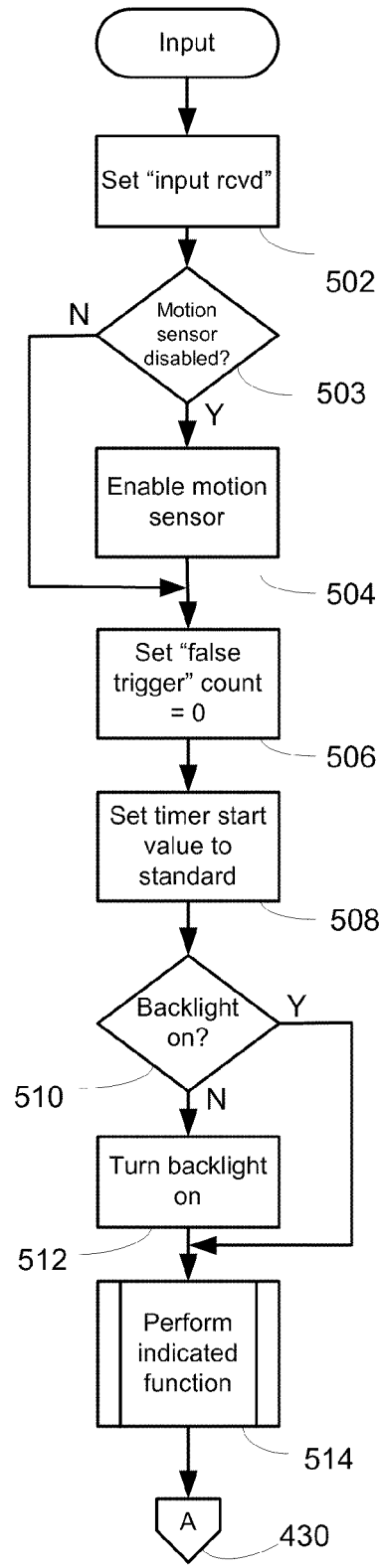

Turning now to FIG. 5, upon detection of a predetermined event type by the device, e.g., a user interaction with controlling device 100 such as pressing of a key, activating a touch pad, moving a switch or scroll wheel, etc., to perform a function, at steps 502 through 508 the controlling device operating program may function to reset and reinitialize values utilized in connection with the procedure described above in connection with FIG. 4. In this regard, the resetting may be accomplished by setting an "input received" status to "true," clearing any feature disabled status, e.g., "motion sensor disabled," clearing the "false trigger" count, and resetting the feature timer, e.g., the backlight timer start value, to its default value. In some embodiments, the false trigger count may decremented rather than cleared, and/or the feature timer start value incrementally increased over successive valid input events, i.e. restoration of normal false trigger sensitivity and full feature "on" period may be progressive, requiring repeated valid user inputs. Thereafter, at steps 510 and 512 the controlling device operating program may check if the feature, e.g., backlight illumination, is already on and if not, turn it on, e.g., by energizing backlight circuitry 320. At step 514, the user indicated function is then performed, e.g. transmitting a command to a controlled appliance 106 or 108, changing a controlling device mode, performing a local operation, etc., all as well known in the art. Once the user indicated function is completed, the controlling device operating program may continue processing at step 430 of the flow previously illustrated in FIG. 4, e.g., start a timer which will shut the backlight down after a period of inactivity. It will thus be apparent that, in this example, repeated user activity within the timeout period will maintain the backlighting "on" state until such activity eventually ceases, and also that any "motion sensor disabled" status which may have been previously caused by a series of false triggers will be immediately cleared by any user interaction with controlling device 100.

It will be appreciated that various modifications may be made to the illustrative embodiment described above and in FIGS. 4 and 5. For example, in place of automatic reinstatement of motion sensor functionality as described above, a specific user interaction may be required to reset "motion sensor disabled" once such a status has been established. In other embodiments, an additional provision may be made for a user initiated explicit enable/disable function to periodically override the automatic operation described above. Additionally, in some embodiments a further false trigger threshold may be established to detect rapid or continuous false triggering such as might be caused, for example, by a faulty motion sensor and to disable automatic feature restoration under such circumstances.

While various concepts have been described in detail, it will be appreciated by those skilled in the art that various modifications and alternatives to those concepts could be developed in light of the overall teachings of the disclosure. For example, while presented herein via an illustrative embodiment of a controlling device, it will be appreciated that the methods described herein may be generally applied to any hand held device incorporating sensing means to activate all or any portion of the device circuitry or functionality.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A method for controlling a time-limited feature of a device which is caused to be activated upon the occurrence of a triggering event, comprising:
   sensing via a triggering sensor of the device an occurrence of the triggering event;

determining at the device if the triggering event sensed via the triggering sensor is a false trigger event; and downwardly adjusting a time period during which the time-limited feature will be allowed to be active upon a future occurrence of a triggering event in response to the device determining that a predetermined number of trigger events sensed via the triggering sensor are false trigger events.

2. The method as recited in claim 1, wherein the triggering sensor comprises a motion triggering sensor.

3. The method as recited in claim 2, wherein the time-limited feature comprises an illumination of keys of the device.

4. The method as recited in claim 2, wherein the time-limited feature comprises an illumination of a display of the device.

5. The method as recited in claim 1, wherein the time period during which the time-limited feature will be allowed to be active is incrementally adjusted downwardly.

6. The method as recited in claim 1, wherein the time period during which the time-limited feature will be allowed to be active is adjusted to zero.

7. The method as recited in claim 6, comprising disabling the triggering sensor to thereby adjust to zero the time period during which the time-limited feature will be allowed to be active.

8. The method as recited in claim 1, wherein the step of determining at the device if the triggering event sensed via the triggering sensor is a false trigger event comprises determining if a predetermined event input is received at the device within a time period subsequent to a triggering event being sensed via the triggering sensor.

9. The method as recited in claim 8, wherein the predetermined event input comprises a sensed user interaction with an input device of the device.

10. The method as recited in claim 9, wherein the input device comprises a key matrix.

11. The method as recited in claim 10, wherein the device comprises a remote control.

12. The method as recited in claim 10, wherein the device comprises a mobile phone.

13. The method as recited in claim 10, wherein a touch screen display comprises the key matrix.

14. The method as recited in claim 1, comprising resetting to an initial value the time period during which the time-limited feature will be allowed to be active upon a future occurrence of a triggering event in response to the device receiving a predetermined event input.

15. The method as recited in claim 14, wherein the predetermined event input comprises a trigger event sensed via the triggering sensor that is a non-false trigger event.

16. The method as recited in claim 14, wherein the predetermined event input comprises a user interaction with a key matrix of the device.

17. A method for controlling a time-limited feature of a hand-held device which is caused to be activated upon the occurrence of a triggering event, comprising:

sensing via a triggering sensor of the device an occurrence of the triggering event;

determining at the device if the triggering event sensed via the triggering sensor is a false trigger event; and temporarily disabling the triggering sensor and, thereby, the time-limited feature, in response to the device determining that a predetermined number of trigger events sensed via the triggering sensor are false trigger events.

18. The method as recited in claim 17, wherein the triggering sensor comprises a motion triggering sensor.

19. The method as recited in claim 18, wherein the time-limited feature comprises an illumination of keys of the hand-held device.

20. The method as recited in claim 18, wherein the time-limited feature comprises an illumination of a display of the hand-held device.

21. The method as recited in claim 17, wherein the step of determining at the hand-held device if the triggering event sensed via the triggering sensor is a false trigger event comprises determining if a predetermined event input is received at the hand-held device within a time period subsequent to a triggering event being sensed via the triggering sensor.

22. The method as recited in claim 21, wherein the predetermined event input comprises a sensed user interaction with an input device of the hand-held device.

23. The method as recited in claim 21, wherein the input device comprises a key matrix.

24. The method as recited in claim 17, wherein the hand-held device comprises a remote control.

25. The method as recited in claim 17, wherein the hand-held device comprises a mobile phone.

* * * * *